(12) United States Patent
Shin et al.

(45) Date of Patent: Feb. 19, 2019
(10) Patent No.: US 10,207,566 B2

(54) AIR CONDITIONING SYSTEM FOR VEHICLE INCLUDING TWO CONDENSERS AND A CONTROL DOOR WITHIN A DUCT TO SELECTIVELY CONTROL AIRFLOW THROUGH SAID TWO CONDENSERS

(71) Applicant: Hyundai Motor Company, Seoul (KR)

(72) Inventors: Gee Young Shin, Suwon-si (KR); June Kyu Park, Hwaseong-si (KR); Keon Soo Jin, Ulsan (KR); Dae Ig Jung, Suwon-si (KR); Kwang Woon Cho, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 85 days.

(21) Appl. No.: 15/066,980

(22) Filed: Mar. 10, 2016

(65) Prior Publication Data
US 2017/0100986 A1 Apr. 13, 2017

(30) Foreign Application Priority Data
Oct. 8, 2015 (KR) .................. 10-2015-0141614

(51) Int. Cl.
*F25D 17/04* (2006.01)
*B60H 1/00* (2006.01)

(52) U.S. Cl.
CPC ..... *B60H 1/00899* (2013.01); *B60H 1/00057* (2013.01); *B60H 2001/00178* (2013.01)

(58) Field of Classification Search
CPC ........... B60H 1/00564; B60H 1/00885; B60H 1/00921; B60H 2001/00135; B60H 40/00; B60H 1/00835; F25B 6/04; F25B 40/02; F25B 40/00
See application file for complete search history.

(56) References Cited

U.S. PATENT DOCUMENTS

| 4,350,020 | A | | 9/1982 | Rojey |
| 5,277,032 | A | * | 1/1994 | See .................. F25B 45/00 62/125 |
| 5,937,669 | A | | 8/1999 | Okuri |

(Continued)

FOREIGN PATENT DOCUMENTS

| JP | 06-040240 A | 2/1994 |
| JP | 08-238919 A | 9/1996 |

(Continued)

*Primary Examiner* — David Teitelbaum
(74) *Attorney, Agent, or Firm* — Morgan, Lewis & Bockius LLP

(57) ABSTRACT

An air conditioning system for a vehicle may include a cooling module including a cooling duct, a cooling-side inlet formed in a first end of the cooling duct, a cooling-side indoor outlet and a cooling-side outdoor outlet formed in a second end of the cooling duct, and an evaporator core provided in the cooling duct, a heating module including a heating duct, a heating-side inlet formed in a first end of the heating duct, a heating-side indoor outlet and a heating-side outdoor outlet formed in a second end of the heating duct, and a plurality of condensers provided in the heating duct, and a cooling blower and a heating blower respectively provided in the cooling duct and the heating duct, in which the plurality of condensers provided in the heating duct and the evaporator core provided in the cooling duct are coupled on a single refrigerant circuit.

7 Claims, 3 Drawing Sheets

(56) References Cited

U.S. PATENT DOCUMENTS

| | | | |
|---|---|---|---|
| 6,230,506 B1 | 5/2001 | Nishida et al. | |
| 6,557,372 B1* | 5/2003 | Ozawa | F25B 6/04 |
| | | | 165/144 |
| 2011/0016896 A1* | 1/2011 | Oomura | B60H 1/00785 |
| | | | 62/155 |
| 2013/0042637 A1 | 2/2013 | Richter et al. | |
| 2013/0333406 A1 | 12/2013 | Takahashi | |
| 2015/0082820 A1* | 3/2015 | Takahashi | B60H 1/0005 |
| | | | 62/238.7 |
| 2015/0239322 A1* | 8/2015 | Yokoo | F25B 5/04 |
| | | | 62/158 |

FOREIGN PATENT DOCUMENTS

| | | |
|---|---|---|
| JP | 09-099734 A | 4/1997 |
| JP | 2010-23589 A | 2/2010 |
| JP | 2014-61876 A | 4/2014 |
| JP | 2014-61877 A | 4/2014 |
| JP | 2015-193381 A | 11/2015 |
| KR | 10-2002-0038149 A | 5/2002 |
| KR | 10-2007-0064937 A | 6/2007 |
| KR | 10-2009-0103742 A | 10/2009 |
| KR | 10-2014-0073034 A | 6/2014 |
| KR | 10-2015-0039545 A | 4/2015 |

\* cited by examiner

AIR CONDITIONING SYSTEM FOR VEHICLE INCLUDING TWO CONDENSERS AND A CONTROL DOOR WITHIN A DUCT TO SELECTIVELY CONTROL AIRFLOW THROUGH SAID TWO CONDENSERS

CROSS REFERENCE TO RELATED APPLICATION

The present application claims priority to Korean Patent Application No. 10-2015-0141614, filed Oct. 8, 2015, the entire contents of which is incorporated herein for all purposes by this reference.

BACKGROUND OF THE INVENTION

Field of the Invention

The present invention relates to a structure of an air conditioning apparatus, and more particularly to the configuration of an air conditioning system which is capable of more efficiently performing air conditioning under specified driving conditions.

Description of Related Art

Generally, vehicles are provided with an air conditioning system for cooling or heating a passenger compartment. The air conditioning system aims to maintain the temperature of the passenger compartment of the vehicle in a pleasant and comfortable condition.

A cooling apparatus of the air conditioning system includes a compressor that compresses refrigerant, a condenser that condenses the refrigerant compressed by the compressor, an expansion valve that converts the refrigerant, which has been condensed and liquefied by the condenser, into a high-temperature and high-pressure state, and an evaporator that uses evaporation latent heat of the refrigerant to cool air. Such a cooling system typically reduces the temperature of air and adjusts the absolute humidity.

A heating system for vehicles uses, as a heat source, coolant that is in a high-temperature state by absorbing heat from an engine to reduce the temperature of the engine room. The heating system typically includes a heater core and a pump for circulating coolant of the engine. Generally, such a heating system increases the temperature of air and adjusts the relative humidity.

Although conventional air conditioning systems use a cooling apparatus to supply cooled air to a passenger compartment and use coolant of an engine to supply hot air thereto, modifications in structure of the systems may be required depending on vehicle driving conditions. Particularly, in the case where there is no coolant for the engine, it is difficult to configure the conventional air conditioning system, and the system is inefficient.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air conditioning system for a vehicle which provides a new type of heat source for supply of hot air from the air conditioning system, and which has an optimized structure for the heat source and is able to improve air conditioning efficiency.

According to various aspects of the present invention, an air conditioning system for a vehicle may include a cooling module including a cooling duct, a cooling-side inlet formed in a first end of the cooling duct, a cooling-side indoor outlet and a cooling-side outdoor outlet formed in a second end of the cooling duct, and an evaporator core provided in the cooling duct, a heating module including a heating duct, a heating-side inlet formed in a first end of the heating duct, a heating-side indoor outlet and a heating-side outdoor outlet formed in a second end of the heating duct, and a plurality of condensers provided in the heating duct, and a cooling blower and a heating blower respectively provided in the cooling duct and the heating duct, in which the plurality of condensers provided in the heating duct and the evaporator core provided in the cooling duct may be coupled on a single refrigerant circuit.

The plurality of condensers may include a first condenser, and a second condenser having a size smaller than the first condenser.

A compressor, an expansion valve, and a three-way valve may be provided on the refrigerant circuit, and refrigerant having passed through the compressor may be drawn into the first condenser, refrigerant having passed through the first condenser may be drawn into the second condenser or the expansion valve via the three-way valve, the refrigerant drawn into the second condenser may flow to the expansion valve, and refrigerant having passed through the expansion valve may be drawn into the compressor again via the evaporator core.

The air conditioning system may further include a condenser selection door provided on a surface of the second condenser that faces an upstream side of the heating duct, the condenser selection door being configured to select at least one of the plurality of condensers to exchange heat with air drawn into the heating duct.

When the condenser selection door is closed, the air drawn into the heating duct may exchange heat with the first condenser, and when the condenser selection door is open, the air drawn into the heating duct may exchange heat with the first condenser and the second condenser.

The air conditioning system may further include a cooling-side exhaust control door provided between the indoor outlet and the outdoor outlet of the cooling duct and configured to control a rate of outflow of air, and a heating-side exhaust control door provided between the indoor outlet and the outdoor outlet of the heating duct and configured to control a rate of outflow of air.

The air conditioning system may further include a controller configured to control operations of the three-way valve, the condenser selection door, the cooling-side exhaust control door, and the heating-side exhaust control door, in which when the air conditioning system is operated in a heating mode, the three-way valve may be controlled to block refrigerant from flowing into the second condenser, the condenser selection door may be controlled and closed so that air drawn into the heating duct exchanges heat with the first condenser, the heating-side exhaust control door may be controlled to close the heating-side outdoor outlet, and the cooling-side exhaust control door may be controlled to close the cooling-side indoor outlet.

The air conditioning system may further include a controller configured to control operations of the three-way valve, the condenser selection door, the cooling-side exhaust control door, and the heating-side exhaust control door, in which when the air conditioning system is operated in a cooling mode, refrigerant may be allowed to flow into the second condenser, the condenser selection door may be controlled and opened so that air drawn into the heating duct exchanges heat with the first condenser and the second condenser, the heating-side exhaust control door may be controlled to close the heating-side indoor outlet, and the cooling-side exhaust control door may be controlled to close the cooling-side outdoor outlet.

As described above, an air conditioning system for a vehicle according to the present invention can provide improved energy efficiency even under conditions in which there is no supply of coolant for an engine and enhance air conditioning efficiency.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
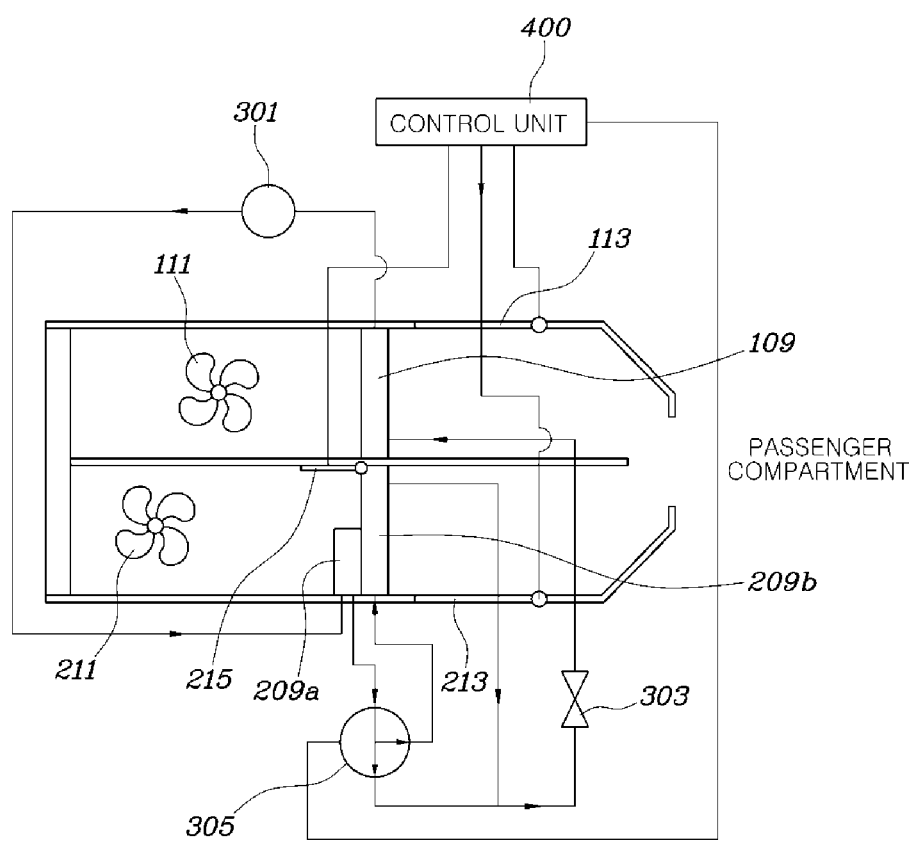
FIG. 1 is a view illustrating the configuration of an exemplary air conditioning system for a vehicle according to the present invention.
Figure 2:
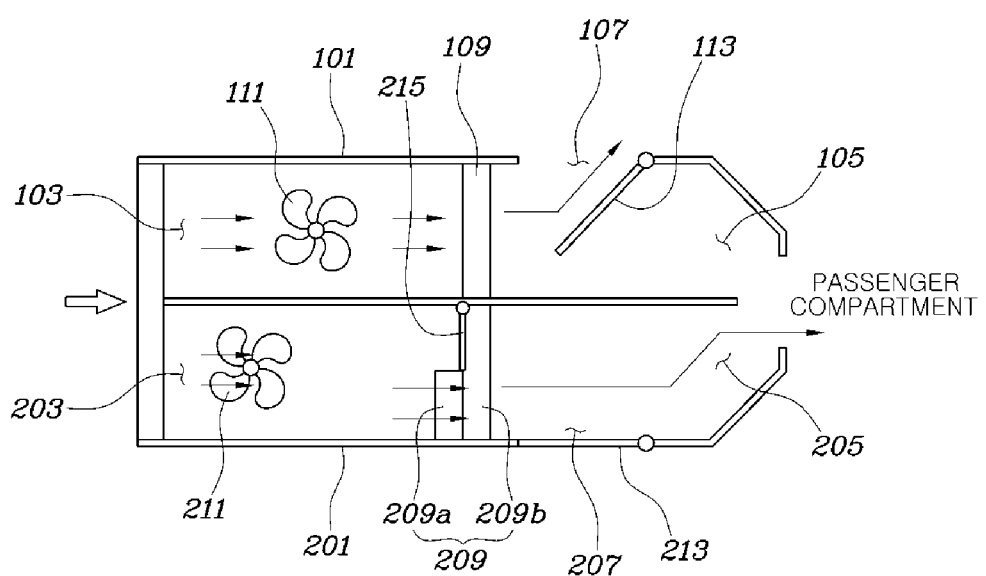
FIG. 2 is a view showing the operation of the exemplary air conditioning system in a heating mode according to the present invention.
Figure 3:
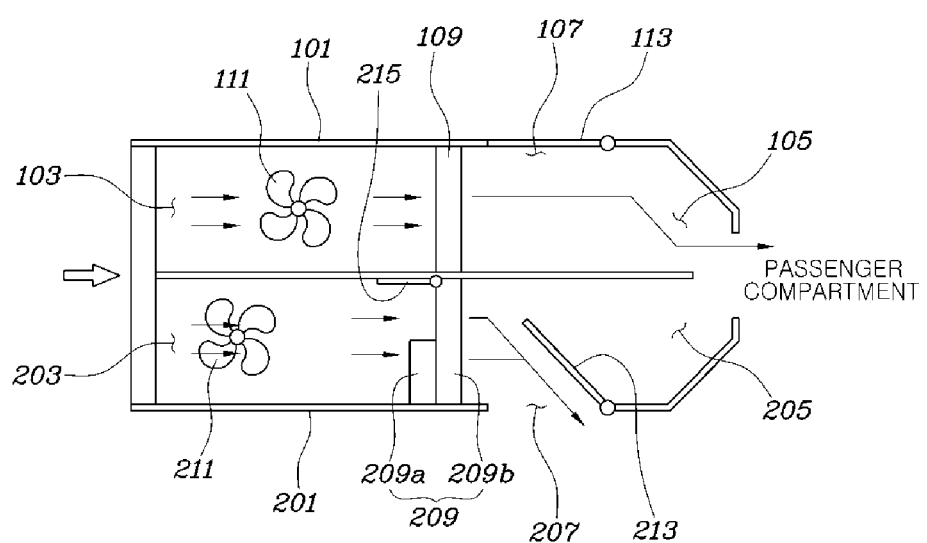
FIG. 3 is a view showing the operation of the exemplary air conditioning system in a cooling mode according to the present invention.

FIG. 1 is a view illustrating the configuration of an air conditioning system for a vehicle according to various embodiments of the present invention. FIG. 2 is a view showing the operation of the air conditioning system in a heating mode according to various embodiments of the present invention. FIG. 3 is a view showing the operation of the air conditioning system in a cooling mode according to various embodiments of the present invention.

The air conditioning system according to various embodiments of the present invention includes a cooling module which includes a cooling duct 101, a cooling-side inlet 103 formed in a first end of the cooling duct 101, a cooling-side indoor outlet 105 and a cooling-side outdoor outlet 107 formed in a second end of the cooling duct 101, and an evaporator core 109 provided in the cooling duct 101, a heating module which includes a heating duct 201, a heating-side inlet 203 formed in a first end of the heating duct 201, a heating-side indoor outlet 205 and a heating-side outdoor outlet 207 formed in a second end of the heating duct 201, and a plurality of condensers 209 provided in the heating duct 201, and a cooling blower 111 and a heating blower 211 which are respectively provided in the cooling duct 101 and the heating duct 201. The condensers 209 provided in the heating duct 201 and the evaporator core 109 provided in the cooling duct 101 are coupled on a single refrigerant circuit.

The air conditioning system will be described in more detail with reference to FIG. 1. The cooling module includes the cooling duct 101. The cooling-side inlet 103 is formed in the first end of the cooling duct 101. The cooling-side indoor outlet 105 and the cooling-side outdoor outlet 107 are formed in the second end of the cooling duct 101. The evaporator core 109 is provided in the cooling duct 101. The heating module includes the heating duct 201. The heating-side inlet 203 is formed in the first end of the heating duct 201. The heating-side indoor outlet 205 and the heating-side outdoor outlet 207 are formed in the second end of the heating duct 201. The plurality of condensers 209 are provided in the heating duct 201. The cooling blower 111 and the heating blower 211 are respectively provided in the cooling duct 101 and the heating duct 201. The condensers 209 are provided in the heating duct 201 and the evaporator core 109 provided in the cooling duct 101 are coupled on a single refrigerant circuit.

In the present invention, the cooling duct 101 and the heating duct 201 are provided as separate independent spaces in the air conditioning system so that interference between conditioned airs can be reduced. Thus, cooled air can be prevented from being reheated, or heated air can be prevented from being re-cooled, whereby the efficiency of the air conditioning system can be improved. Furthermore, the cooling blower 111 and the heating blower 211 are respectively separately provided in the cooling duct 101 and the heating duct 201 so that a sufficient amount of air can be supplied into the passenger compartment of the vehicle. In addition, the outlet of each of the cooling duct 101 and the heating duct 201 includes the indoor outlet and the outdoor outlet which are separately formed. Hence, as needed, conditioned air may be discharged to the outside rather than being supplied into only the passenger compartment.

The condensers 209 may include a first condenser 209a which is comparatively small, and a second condenser 209b which is larger than the first condenser 209a.

A compressor 301, an expansion valve 303, and a three-way valve 305 are provided on the refrigerant circuit. Refrigerant that has passed through the compressor 301 is drawn into the first condenser 209a. Refrigerant that has passed through the first condenser 209a is drawn into the second condenser 209b or the expansion valve 305 via the three-way valve 305. Refrigerant drawn into the second condenser 209b flows to the expansion valve 303. Refrigerant that has passed through the expansion valve 303 is drawn into the compressor 301 again via the evaporator core 109.

Referring to FIG. 1, in the present invention, the expansion valve 303, the evaporator core 109, the compressor 301, and condenser 209 are disposed on the single cooling line. Thus, high-temperature and high-pressure refrigerant that has passed through the compressor 30 can be used as a heat source. That is, the present invention can conduct both cooling and heating functions using the configuration corresponding to only the cooling system of the conventional air conditioning system for vehicles. This configuration can be effectively used under conditions in which a heat source such as coolant of an engine cannot be provided. Furthermore, the structure of the air conditioning system according to the present invention is simple because there is no need for a separate heating line or water pump. Since a cooling region of refrigerant can be expanded, the efficiency of the air conditioning system can be improved.

The air conditioning system may further include: a cooling-side exhaust control door 113 which is provided between the indoor outlet and the outdoor outlet of the cooling duct 101 to control a rate of outflow of air; a heating-side exhaust control door 213 which is provided between the indoor outlet and the outdoor outlet of the heating duct 201 to control a rate of outflow of air.

The air conditioning system according to the present invention can control whether conditioned air is supplied into the passenger compartment or discharged to the outside using the cooling-side exhaust control door 113 and the heating-side exhaust control door 213. Furthermore, a mixture ratio of air conditioned by the cooling module or the heating module can be adjusted by controlling the cooling-side exhaust control door 113 and the heating-side exhaust control door 213, whereby precise air conditioning for the passenger compartment is possible.

In a maximum cooling mode, the cooling-side exhaust control door 113 closes the cooling-side outdoor outlet 107 so that cooled air can be supplied into the passenger compartment, and the heating-side exhaust control door 213 closes the heating-side indoor outlet 205 so that heated air can be discharged to the outside. In a maximum heating mode, the heating-side exhaust control door 213 closes the heating-side outdoor outlet 207 so that heated air can be supplied into the passenger compartment, and the cooling-side exhaust control door 113 closes the cooling-side indoor outlet 105 so that cooled air can be discharged to the outside.

The air conditioning system may further include a condenser selection door 215 which is provided on a surface of the second condenser that faces an upstream side of the heating duct 201. The condenser selection door 215 functions to select at least one of the condensers 209 to exchange heat with air drawn into the heating duct 201.

When the condenser selection door 215 is closed, air drawn into the heating duct 201 exchanges heat with the first condenser 209a. When the condenser selection door 215 is open, air drawn into the heating duct 201 exchanges heat with the first condenser 209a and the second condenser 209b.

The air conditioning system may further include a controller 400 which controls the operations of the three-way valve 305, the condenser selection door 215, the cooling-side exhaust control door 113, and the heating-side exhaust control door 213. When the air conditioning system is operated in a heating mode, the three-way valve 305 is controlled to block refrigerant from flowing into the second condenser 209b, the condenser selection door 215 is controlled and closed so that air drawn into the heating duct 201 exchanges heat with the first condenser 209a, the heating-side exhaust control door 213 is controlled to close the heating-side outdoor outlet 207, and the cooling-side exhaust control door 113 is controlled to close the cooling-side indoor outlet 105.

When the air conditioning system is operated in a cooling mode, refrigerant is allowed to flow into the second condenser 209b, the condenser selection door 215 is controlled and opened so that air drawn into the heating duct 201 exchanges heat with the first condenser 209a and the second condenser 209b, the heating-side exhaust control door 213 is controlled to close the heating-side indoor outlet 205, and the cooling-side exhaust control door 113 is controlled to close the cooling-side outdoor outlet 107.

In the present invention, the two condensers 209 having different sizes are provided in the heating duct 201. The heating value is controlled by the two condensers 209. Therefore, the efficiency of the operation of the air conditioning system can be enhanced. The first condenser 209a which is disposed at the upstream side in the heating duct 201 is smaller than the second condenser 209b.

In the cooling mode, the evaporator core 109 must be cooled in order to enhance the cooling performance. This means that when refrigerant passes through the condensers 209, the temperature of the evaporator core 109 must be reduced as much as possible. That is, when refrigerant that has been compressed by the compressor 301 to a high-temperature and high-pressure gas state passes through the condenser 209, the refrigerant must lose as much heat as possible. For this, both the first condenser 209a and the second condenser 209b are used to increase the heat dissipation area of the condenser 209. Furthermore, to increase the efficiency of heat dissipation, the condenser selection door 215 opens so that air drawn into the heating duct 201 can pass through both the first condenser 209a and the second condenser 209b for heat exchange.

In the heating mode, rather than increasing the absolute heating value of the entirety of the condensers 209, a high-temperature heat source is required to heat drawn air and supply conditioned air of a temperature meeting the requirement of a user into the passenger compartment even though the entire heating value of the condensers 209 is reduced. Therefore, the three-way valve 305 is controlled to block refrigerant from flowing to the second condenser 209b. Thereby, the heating value of the refrigerant is reduced, and the refrigerant is allowed to flow through only the first condenser 209a, thus providing a high-temperature heat source that can heat air to be supplied into the passenger compartment. Furthermore, the condenser selection door 215 is controlled to be closed so that all air passing through the heating duct 201 can exchange heat with the first condenser 209a.

As described above, the efficiency of operation of the air conditioning system can be improved by adjusting the number of condensers 209 used depending on whether the system is in the cooling mode or the heating mode.

In particular, the present invention can be more effectively applied to a vehicle such as an electric vehicle using a high-voltage battery which is a limited energy source. The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air conditioning system for a vehicle, comprising:
    a cooling module including a cooling duct, a cooling-side inlet formed in a first end of the cooling duct, a cooling-side indoor outlet and a cooling-side outdoor outlet formed in a second end of the cooling duct, and an evaporator core provided in the cooling duct;
    a heating module including a heating duct, a heating-side inlet formed in a first end of the heating duct, a heating-side indoor outlet and a heating-side outdoor outlet formed in a second end of the heating duct, and a plurality of condensers provided in the heating duct; and
    a cooling blower and a heating blower respectively provided in the cooling duct and the heating duct,
    wherein the plurality of condensers provided in the heating duct and the evaporator core provided in the cooling duct are coupled on a single refrigerant circuit, and
    wherein the plurality of condensers includes a first condenser and a second condenser in the heating duct, and a size of the first condenser is smaller than a size of the second condenser,
    wherein the air conditioning system further includes a condenser selection door provided on a surface of the second condenser that faces an upstream side of the heating duct, the condenser selection door being configured to select at least one of the plurality of condensers to exchange heat with air drawn into the heating duct, and
    wherein when the condenser selection door is closed, the air drawn into the heating duct exchanges heat with the first condenser, and when the condenser selection door is open, the air drawn into the heating duct exchanges heat with the first condenser and the second condenser.

2. The air conditioning system according to claim 1, wherein a compressor, an expansion valve, and a three-way valve are provided on the single refrigerant circuit, and
    refrigerant having passed through the compressor is drawn into the first condenser, refrigerant having passed through the first condenser is drawn into the second condenser or the expansion valve via the three-way valve, the refrigerant drawn into the second condenser flows to the expansion valve, and refrigerant having passed through the expansion valve is drawn into the compressor again via the evaporator core.

3. The air conditioning system according to claim 1, further comprising:
    a cooling-side exhaust control door provided between the indoor outlet and the outdoor outlet of the cooling duct and configured to control a rate of outflow of air; and
    a heating-side exhaust control door provided between the indoor outlet and the outdoor outlet of the heating duct and configured to control the rate of outflow of air.

4. The air conditioning system according to claim 2, further comprising:
    a controller configured to control operations of the three-way valve, the condenser selection door, a cooling-side exhaust control door, and a heating-side exhaust control door,
    wherein when the air conditioning system is operated in a heating mode, the three-way valve is controlled to block refrigerant from flowing into the second condenser, the condenser selection door is controlled and closed so that air drawn into the heating duct exchanges heat with the first condenser, the heating-side exhaust control door is controlled to close the heating-side outdoor outlet, and the cooling-side exhaust control door is controlled to close the cooling-side indoor outlet.

5. The air conditioning system according to claim 2, further comprising:
    a controller configured to control operations of the three-way valve, the condenser selection door, a cooling-side exhaust control door, and a heating-side exhaust control door,
    wherein when the air conditioning system is operated in a cooling mode, refrigerant is allowed to flow into the second condenser, the condenser selection door is controlled and opened so that air drawn into the heating duct exchanges heat with the first condenser and the second condenser, the heating-side exhaust control door is controlled to close the heating-side indoor outlet, and the cooling-side exhaust control door is controlled to close the cooling-side outdoor outlet.

6. The air conditioning system according to claim 3, further comprising:
    a controller configured to control operations of a three-way valve, the condenser selection door, the cooling-side exhaust control door, and the heating-side exhaust control door,
    wherein when the air conditioning system is operated in a heating mode, the three-way valve is controlled to block refrigerant from flowing into the second condenser, the condenser selection door is controlled and closed so that air drawn into the heating duct exchanges heat with the first condenser, the heating-side exhaust control door is controlled to close the heating-side outdoor outlet, and the cooling-side exhaust control door is controlled to close the cooling-side indoor outlet.

7. The air conditioning system according to claim 3, further comprising:
    a controller configured to control operations of a three-way valve, the condenser selection door, the cooling-side exhaust control door, and the heating-side exhaust control door,
    wherein when the air conditioning system is operated in a cooling mode, refrigerant is allowed to flow into the second condenser, the condenser selection door is controlled and opened so that air drawn into the heating duct exchanges heat with the first condenser and the second condenser, the heating-side exhaust control door is controlled to close the heating-side indoor outlet, and the cooling-side exhaust control door is controlled to close the cooling-side outdoor outlet.

* * * * *